United States Patent
Abe et al.

(10) Patent No.: US 10,538,668 B2
(45) Date of Patent: Jan. 21, 2020

(54) PIGMENT COMPOSITION PRODUCTION METHOD

(71) Applicant: KAO CORPORATION, Tokyo (JP)

(72) Inventors: Shuichi Abe, Wakayama (JP); Tsuyoshi Oda, Wakayama (JP); Toshiya Iwasaki, Iwade (JP)

(73) Assignee: KAO CORPORATION, Tokyo (JP)

(*) Notice: Subject to any disclaimer, the term of this patent is extended or adjusted under 35 U.S.C. 154(b) by 1 day.

(21) Appl. No.: 15/767,929

(22) PCT Filed: Oct. 4, 2016

(86) PCT No.: PCT/JP2016/079554
§ 371 (c)(1),
(2) Date: Apr. 12, 2018

(87) PCT Pub. No.: WO2017/065062
PCT Pub. Date: Apr. 20, 2017

(65) Prior Publication Data
US 2018/0305553 A1  Oct. 25, 2018

(30) Foreign Application Priority Data

Oct. 13, 2015 (JP) .................. 2015-202023
Sep. 6, 2016 (JP) .................. 2016-174012

(51) Int. Cl.
C09B 29/33 (2006.01)
C09D 17/00 (2006.01)
C09D 11/322 (2014.01)

(52) U.S. Cl.
CPC ............ *C09B 29/33* (2013.01); *C09D 17/003* (2013.01); *C09D 11/322* (2013.01)

(58) Field of Classification Search
CPC ....... C09B 29/33; C09D 17/003; C09D 11/322
See application file for complete search history.

(56) References Cited

U.S. PATENT DOCUMENTS

| 6,432,192 B1 | 8/2002 | Cook et al. |
| 6,692,559 B2 * | 2/2004 | Ishigami ............. C09B 67/0051 106/31.8 |
| 9,133,356 B2 * | 9/2015 | Yoshida ............... C09D 11/326 |
| 2007/0169665 A1 | 7/2007 | Schweikart et al. |
| 2008/0115695 A1 | 5/2008 | Sujeeth et al. |

FOREIGN PATENT DOCUMENTS

| CN | 1926199 A | 3/2007 |
| JP | 7-126545 A | 5/1995 |
| JP | 2003-524055 A | 8/2003 |
| JP | 2004-123866 A | 4/2004 |
| JP | 2008-63524 A | 3/2008 |
| JP | 2008063524 A * | 3/2008 |
| JP | 2010-508426 A | 3/2010 |
| JP | 2014-177575 A | 9/2014 |
| JP | 2015199809 A * | 11/2015 |
| JP | 2016-23267 A | 2/2016 |

OTHER PUBLICATIONS

International Search Report for PCT/JP2016/079554 (PCT/ISA/210) dated Nov. 29, 2016.
Poskočil et al., Aromatische Diazo- und Azoverbindungen XXXIV. Abspaltung der Acetylgruppe Aus Den Von Acetoacetanilid Abgeleiteten Azofarbstoffen Und Die Darstellung Neuer Formazan-Farbstoffe (Aromatic diazo- and azo compounds. XXXIV. Cleavage of the acetyl group in azo dyes derived from acetanilide and preparation of new formazan dyes), Collection of Czechoslovak Chemical Communications, 1959, 24, pp. 3746-3753.
Extended European Search Report, dated May 8, 2019, for European Application No. 16855316.2.

* cited by examiner

*Primary Examiner* — Anthony J Green
(74) *Attorney, Agent, or Firm* — Birch, Stewart, Kolasch & Birch, LLP

(57) ABSTRACT

The present invention relates to [1] a process for producing a pigment composition, including the step of subjecting a raw material pigment composition containing C.I. Pigment Yellow 74, a specific by-product and water to heat treatment at a temperature of from 160 to 210° C.; and [2] a method of reducing a content of a by-product in a raw material pigment composition containing C.I. Pigment Yellow 74, the specific by-product and water, said method including the step of subjecting the raw material pigment composition to heat treatment at a temperature of from 160 to 210° C.

21 Claims, No Drawings

PIGMENT COMPOSITION PRODUCTION METHOD

FIELD OF THE INVENTION

The present invention relates to a process for producing a pigment composition containing C.I. Pigment Yellow 74 and water, and a method of reducing a content of a by-product in a raw material pigment composition.

BACKGROUND OF THE INVENTION

In ink-jet printing methods, droplets of ink are directly projected onto a printing medium from very fine nozzles and allowed to adhere to the printing medium to form characters or images thereon. The ink-jet printing methods have now been employed not only in printing applications for ordinary consumers, but also recently in commercial and industrial printing applications because of various advantages such as easiness of full coloration, low cost, capability of using a plain paper as the printing medium, non-contact with printed characters or images, etc. As a pigment for a yellow ink used in the ink-jet printing methods, C.I. Pigment Yellow 74 has been extensively used.

JP 2008-63524A (Patent Literature 1) discloses an ink composition containing C.I. Pigment Yellow 74 which is excellent in light resistance and free of ejection defects when used in ink-jet printing methods, in which a content of an anisidide compound having a specific structure in the ink composition is 1 to 20 ppm.

Also, JP 2014-177575A (Patent Literature 2) discloses a process for producing a pigment composition as a method of improving transparency, coloring properties and light resistance of a monoazo yellow pigment composition, which includes a first step of obtaining a crude monoazo pigment composition containing a monoazo pigment and a monoazo compound obtained by a specific reaction, the monoazo compound being contained in a specific amount on the basis of the monoazo pigment, and a second step of subjecting the thus obtained crude monoazo pigment composition to finishing treatment at 115° C. in an autoclave.

SUMMARY OF THE INVENTION

The present invention relates to a process for producing a pigment composition, which includes the step of subjecting a raw material pigment composition containing C.I. Pigment Yellow 74, a compound (I) represented by the below-mentioned formula (I-1) or (I-2) and water to heat treatment at a temperature of not lower than 160° C. and not higher than 210° C.

DETAILED DESCRIPTION OF THE INVENTION

As described in the aforementioned Patent Literatures, etc., various proposals for improving light resistance and the like of the pigment compositions containing C.I. Pigment Yellow 74 and its marginal compounds have been conventionally made. However, it has been required to further improve ejection properties of the pigment compositions by eliminating ejection defects thereof.

The present applicant has already found that the ink composition containing C.I. Pigment Yellow 74 (hereinafter also referred to merely as "PY74") and a compound (I) represented by the following formula (I-1) or (I-2) (a derivative of PY74) in which the latter compound (I) is present in an amount of 1 to 50 mg/kg in the ink composition hardly suffers from occurrence of ejection defects and is excellent in storage stability and color developability, and has filed a patent application (Japanese Patent Application No. 2014-149870) relating to the ink composition.

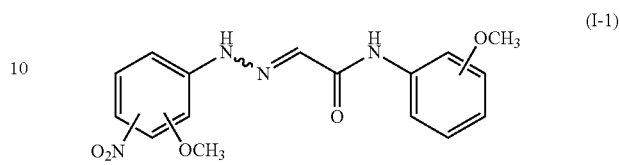

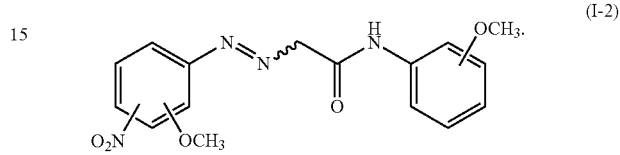

In the Japanese Patent Application No. 2014-149870, it is described that when reducing a content of the compound (I) in the ink composition to a specific concentration or lower in the presence of PY74, crystallization of the compound (I) is inhibited by the interaction with PY74 so that the resulting ink composition can be improved in storage stability and hardly suffers from occurrence of ejection defects.

The present invention relates to a process for producing a pigment composition in which a content of the compound (I) in a raw material pigment composition containing C.I. Pigment Yellow 74, the compound (I) and water can be reduced, as well as a method of reducing a content of the compound (I) in the raw material pigment composition.

The present inventors have found that by subjecting a raw material pigment composition containing C.I. Pigment Yellow 74, the compound (I) and water to heat treatment at a specific temperature, it is possible to effectively reduce a content of the compound (I) in the raw material pigment composition.

That is, the present invention relates to the following aspects [1] and [2].

[1] A process for producing a pigment composition, including the step of subjecting a raw material pigment composition containing C.I. Pigment Yellow 74, a compound (I) represented by the aforementioned formula (I-1) or (I-2) and water to heat treatment at a temperature of not lower than 160° C. and not higher than 210° C.

[2] A method of reducing a content of a compound (I) represented by the aforementioned formula (I-1) or (I-2) in a raw material pigment composition containing C.I. Pigment Yellow 74, the compound (I) represented by the aforementioned formula (I-1) or (I-2) and water, said method including the step of subjecting the raw material pigment composition to heat treatment at a temperature of not lower than 160° C. and not higher than 210° C.

According to the present invention, there are provided a process for producing a pigment composition in which a content of a compound (I) in a raw material pigment composition containing C.I. Pigment Yellow 74, the compound (I) and water can be effectively reduced, as well as a method of effectively reducing a content of the compound (I) in the raw material pigment composition.

[Process for Producing Pigment Composition]

The process for producing a pigment composition according to the present invention includes the step of subjecting a raw material pigment composition containing PY74, a compound (I) represented by the formula (I-1) or (I-2) and water to heat treatment at a temperature of not lower than 160° C. and not higher than 210° C.

The compound (I) which is by-produced in the production process of PY74 is deteriorated in heat resistance as compared to PY74. Therefore, in the production process of the present invention, by utilizing the difference in heat resistance between the compound (I) and PY74, more specifically, by subjecting the raw material pigment composition to heat treatment at a temperature at which the compound (I) is more likely to undergo thermal decomposition than PY74, it is possible to effectively reduce a content of the compound (I) in the raw material pigment composition.

<C.I. Pigment Yellow 74>

The raw material pigment composition used in the present invention contains PY74. PY74 is a compound typically represented by the following formula (II).

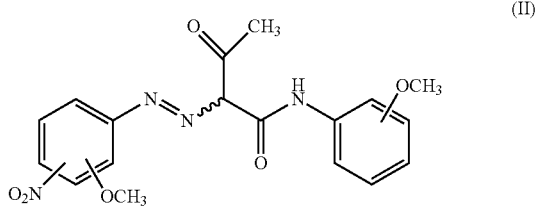

(II)

In the formula (II), the wavy line shows that a geometric isomer of a double bond adjacent thereto is at least one isomer selected from the group consisting of an E isomer and a Z isomer.

The compound represented by the formula (II) is preferably a compound represented by the following formula (II-1), i.e., 2-[(2-methoxy-4-nitrophenyl)azo]-N-(2-methoxyphenyl)-3-oxobutanamide.

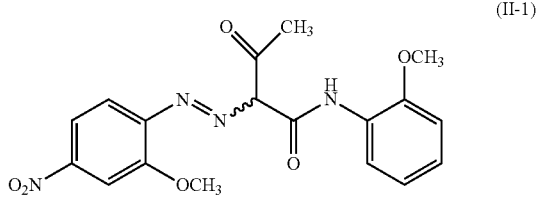 [SMILES: COc1cc([N+](=O)[O-])ccc1N=NC(C(C)=O)C(=O)Nc1ccccc1OC]

(II-1)

(Method of Producing PY74)

As the method of producing PY74, there may be mentioned, for example, a production method (A) of subjecting a diazotization product of m-nitro-o-anisidine to coupling reaction with acetoacetic-o-anisidide.

In the coupling reaction, the aforementioned compound (I) is produced as a by-product.

The production method (A) preferably includes the following steps (1) to (3).

Step (1): subjecting m-nitro-o-anisidine to diazotization reaction to thereby obtain a reaction product A.

Step (2): mixing acetoacetic-o-anisidide, sodium hydroxide and water, and then adding acetic acid to the resulting mixture, followed by further adding sodium acetate to the mixture, to thereby obtain a reaction product B.

Step (3): mixing the reaction product A obtained in the step (1) and the reaction product B obtained in the step (2), and subjecting the resulting mixture to coupling reaction.

The step (1) is the step of subjecting m-nitro-o-anisidine to diazotization reaction to thereby obtain a reaction product A. The diazotization reaction in the step (1) may be conducted, for example, by reacting m-nitro-o-anisidine with nitrous acid or a salt thereof under an acid condition.

The step (2) is the step of mixing acetoacetic-o-anisidide, sodium hydroxide and water and then adding acetic acid to the resulting mixture, followed by further adding sodium acetate to the mixture, to thereby obtain the reaction product B. In the step (2), by controlling amounts of acetic acid and sodium acetate added therein, it is possible to control an amount of the compound (I) by-produced to a certain extent. However, only the procedure of controlling amounts of the acetic acid and sodium acetate is not enough to reduce the amount of the compound (I) by-produced to a sufficient extent.

The mass ratio of sodium acetate to acetic acid (sodium acetate/acetic acid) used in the step (2) is preferably not less than 87/13, more preferably not less than 88/12 and even more preferably not less than 90/10 from the viewpoint of suppressing by-production of the compound (I), and is also preferably not more than 99/1, more preferably not more than 98/2, even more preferably not more than 96/4 and further even more preferably not more than 95/5 from the viewpoint of enhancing productivity of the reaction product. The step (3) is the step of mixing the reaction product A obtained in the step (1) and the reaction product B obtained in the step (2), and subjecting the resulting mixture to coupling reaction. In the step (3), it is preferred that the reaction product A obtained in the step (1) is added to the reaction product B obtained in the step (2).

The temperature used in the coupling reaction is preferably not lower than 0° C., and is also preferably not higher than 25° C., more preferably not higher than 20° C., even more preferably not higher than 15° C. and further even more preferably not higher than 10° C.

After completion of the coupling reaction in the step (3), the obtained reaction mixture may be subjected to additional treatments such as crystallization of the reaction product and treatments for controlling a shape, a size and the like of particles of the reaction product to desired ranges, if required.

<Compound (I)>

The raw material pigment composition used in the present invention contains the compound (I). The compound (I) is a compound represented by the following formula (I-1) or (I-2), and is by-produced during the production process of PY74. The compound (I) is a compound capable of satisfying such a condition that a ratio of an ion mass (m) to an ionic charge (z) (m/z) in a mass spectrum (ionization mode: positive) in mass spectrometry thereof is 345. The compound represented by the following formula (I-1) and the compound represented by the following formula (I-2) have a tautomeric relationship with each other.

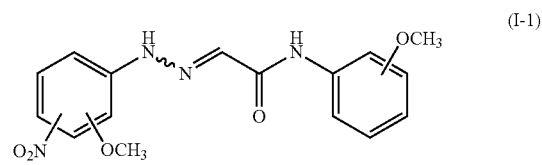

(I-1)

-continued

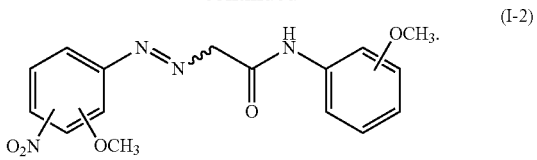
(I-2)

In the formulae (I-1) and (I-2), the wavy line indicates that a geometric isomer of a double bond adjacent thereto is at least one isomer selected from the group consisting of an E isomer and a Z isomer.

The compound represented by the formula (I-1) is preferably a compound represented by the following formula (I-1-1), and the compound represented by the formula (II-2) is preferably a compound represented by the following formula (I-2-1), i.e., 2-[(2-methoxy-4-nitrophenyl)azo]-N-(2-methoxyphenyl)ethanamide.

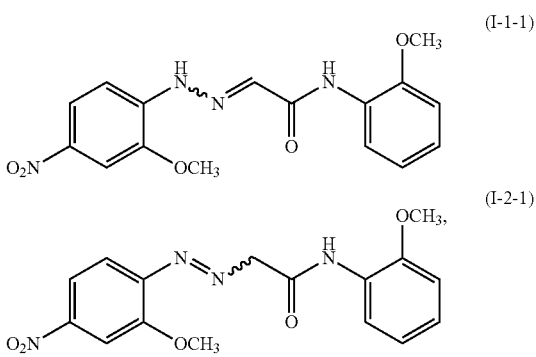

<Water>

Examples of the water used in the present invention include tap water, ion-exchanged water, distilled water, etc. From the viewpoint of maintaining stability of the PY74 upon the treatments, preferred are ion-exchanged water and distilled water, and more preferred is ion-exchanged water.

<Raw Material Pigment Composition>

As the raw material pigment composition used in the production process of the present invention, there may be mentioned a raw material pigment composition (1) containing PY74 obtained by the aforementioned production method (A), etc., and water, a raw material pigment composition (ii) obtained by mixing commercially available PY74 with water by conventionally known methods, a raw material pigment composition (iii) prepared by dispersing commercially available PY74 in water using a polymer dispersant, and the like.

(Raw Material Pigment Composition (iii))

The raw material pigment composition (iii) is preferably obtained by mixing PY74, a polymer dispersant and water with each other and then subjecting the resulting mixture to dispersion treatment using a disperser from the viewpoint of improving productivity of the pigment composition.

The raw material pigment composition (iii) may contain not only the aforementioned polymer dispersant, but also an organic solvent, a surfactant, a pH controller and various other additives, if required.

Examples of the polymer dispersant include synthetic polymers, natural polymers and derivatives of these polymers. Among these polymer dispersants, from the viewpoint of improving storage stability of the resulting ink composition and preventing occurrence of ejection defects when compounding the pigment composition in an ink for ink-jet printing, etc., preferred are synthetic polymers.

From the viewpoint of improving storage stability of the resulting ink composition and preventing occurrence of ejection defects, the synthetic polymers are preferably in the form of a copolymer containing a constitutional unit derived from a hydrophobic group-containing monomer and a constitutional unit derived from a hydrophilic group-containing monomer. Examples of the hydrophobic group-containing monomer include aromatic vinyl monomers such as styrene, (meth)acrylate monomers such as benzyl methacrylate, and hydrophobic monomers such as styrene macromers. Examples of the hydrophilic group-containing monomer include alkoxy polyalkylene glycol (meth)acrylates such as methoxy polyethylene glycol (1 to 30) methacrylate. Examples of the other monomers that may be copolymerized with the aforementioned monomers include other carboxylic acid monomers such as acrylic acid and methacrylic acid. The term "(meth)acrylate" as used herein means an acrylate and/or a methacrylate.

The commercially available products of the aforementioned synthetic polymers are preferably at least one compound selected from the group consisting of a styrene-acrylic acid copolymer and a styrene-methacrylic acid copolymer. Specific examples of the commercially available products of the synthetic polymers include "JONCRYL" series products available from BASF Japan, Ltd., such as "JONCRYL 67", "JONCRYL 68", "JONCRYL 678", "JONCRYL 680", "JONCRYL 682", "JONCRYL 683", "JONCRYL 690", "JONCRYL 819", etc.

The organic solvent is preferably incorporated in the raw material pigment composition from the viewpoint of reducing the content of the compound (I) in the resulting pigment composition.

Examples of the aforementioned organic solvent include monohydric alcohols, polyhydric alcohols, polyhydric alcohol alkyl ethers, polyhydric alcohol alkyl ether acetates and nitrogen-containing heterocyclic compounds. Among these organic solvents, from the viewpoint of improving safety and adaptability to high-pressure reaction vessels, preferred are organic solvents having a boiling point of not lower than 90° C. and more preferably not lower than 120° C. Specific examples of the preferred organic solvents include polyhydric alcohols such as glycerin, and polyhydric alcohol alkyl ethers such as ethylene glycol isopropyl ether.

In addition, from the viewpoint of improving operating properties upon removal of the organic solvent in the additional treatments, as the organic solvents, preferred are ketone-based solvents, more preferred are methyl ethyl ketone and methyl isobutyl ketone, and even more preferred is methyl ethyl ketone. These organic solvents may be used alone or in the form of a mixture of any two or more thereof.

Examples of the surfactant include at least one surfactant selected from the group consisting of a nonionic surfactant such as an organosiloxane-based surfactant and acetylene glycol-based surfactant, and an anionic surfactant such as a phosphoric acid ester-based surfactant.

Examples of the pH controller include amines such as diethanolamine, triethanolamine, propanolamine and morpholine, inorganic salts such as potassium hydroxide and sodium hydroxide, hydroxides such as ammonium hydroxide, e.g., quaternary ammonium hydroxide, carbonates, phosphates, etc.

The aforementioned organic solvents and additives may be respectively used alone or in combination of any two or more thereof.

(Components of Raw Material Pigment Composition)

The total content of PY74 and the compound (I) in the raw material pigment composition (hereinafter also referred to merely as a "raw material pigment content") is preferably not less than 0.1% by mass, more preferably not less than 0.3% by mass, even more preferably not less than 0.5% by mass, further even more preferably not less than 1% by mass, still further even more preferably not less than 2% by mass, still further even more preferably not less than 3% by mass, still further even more preferably not less than 5% by mass, still further even more preferably not less than 8% by mass, still further even more preferably not less than 10% by mass and still further even more preferably not less than 15% by mass from the viewpoint of enhancing productivity of the pigment composition, and is also preferably not more than 30% by mass and more preferably not more than 25% by mass from the viewpoint of preventing deterioration in productivity of the pigment composition owing to increased viscosity of the composition.

In the case of using the raw material pigment composition (i), the raw material pigment content is preferably not less than 0.1% by mass, more preferably not less than 0.3% by mass, even more preferably not less than 0.5% by mass and further even more preferably not less than 1% by mass from the viewpoint of facilitating production of the pigment and enhancing productivity of the pigment composition, and is also preferably not more than 10% by mass, more preferably not more than 5% by mass and even more preferably not more than 3% by mass from the viewpoint of enhancing productivity upon production of the pigment.

In the case of using any of the raw material pigment compositions (ii) and (iii), the raw material pigment content is preferably not less than 0.1% by mass, more preferably not less than 1% by mass, even more preferably not less than 2% by mass, further even more preferably not less than 3% by mass, still further even more preferably not less than 5% by mass, still further even more preferably not less than 8% by mass, still further even more preferably not less than 10% by mass and still further even more preferably not less than 15% by mass from the viewpoint of enhancing productivity of the pigment composition, and is also preferably not more than 30% by mass and more preferably not more than 25% by mass from the viewpoint of preventing deterioration in productivity of the pigment composition owing to increased viscosity of the composition.

In the case of using the raw material pigment composition (iii), the content of the polymer dispersant in the raw material pigment composition is preferably not less than 1% by mass, more preferably not less than 2% by mass and even more preferably not less than 3% by mass from the viewpoint of reducing the content of the compound (I) in the resulting pigment composition as well as from the viewpoint of improving storage stability of the resulting ink composition when compounding the pigment composition in an ink for ink-jet printing, etc., and is also preferably not more than 10% by mass, more preferably not more than 8% by mass and even more preferably not more than 7% by mass from the viewpoint of improving optical density of the resulting ink composition upon printing.

The content of the organic solvent that may be optionally used according to the requirements in the raw material pigment composition is preferably not less than 5% by mass, more preferably not less than 10% by mass and even more preferably not less than 15% by mass from the viewpoint of reducing the content of the compound (I) in the resulting pigment composition as well as from the viewpoint of improving storage stability of the resulting ink composition, and is also preferably not more than 40% by mass, more preferably not more than 30% by mass and even more preferably not more than 25% by mass from the viewpoint of improving optical density of the resulting ink composition upon printing.

The content of the surfactant that may be optionally used according to the requirements in the raw material pigment composition is preferably not less than 0.1% by mass, more preferably not less than 0.3% by mass and even more preferably not less than 0.5% by mass from the viewpoint of improving storage stability of the resulting ink composition, and is also preferably not more than 10% by mass, more preferably not more than 5% by mass and even more preferably not more than 3% by mass from the viewpoint of improving optical density of the resulting ink composition upon printing.

The content of water in the raw material pigment composition is preferably not less than 50% by mass, more preferably not less than 60% by mass and even more preferably not less than 65% by mass from the viewpoint of improving storage stability of the resulting ink composition, and is also preferably not more than 99% by mass, more preferably not more than 90% by mass and even more preferably not more than 80% by mass from the viewpoint of improving optical density of the resulting ink composition upon printing.

<Heat Treatment>

In the process for producing the pigment composition according to the present invention, the raw material pigment composition containing PY74, the compound (I) and water is subjected to heat treatment at a temperature of not lower than 160° C. and not higher than 210° C.

The temperature used in the heat treatment is preferably not lower than 165° C., more preferably not lower than 170° C., even more preferably not lower than 172° C. and further even more preferably not lower than 175° C. from the viewpoint of reducing the content of the compound (I) in the resulting pigment composition by utilizing the difference in heat resistance between PY74 and the compound (I), more specifically, by conducting the heat treatment at a temperature at which the compound (I) is more likely to undergo thermal decomposition as compared to PY74, and is also preferably not higher than 210° C., more preferably not higher than 200° C., even more preferably not higher than 190° C., further even more preferably not higher than 185° C. and still further even more preferably not higher than 180° C. from the viewpoint of inhibiting discoloration of PY74.

The time of the heat treatment is preferably not less than 1 second, more preferably not less than 5 seconds, even more preferably not less than 30 seconds, further even more preferably not less than 1 minute and still further even more preferably not less than 2 minutes from the viewpoint of reducing the content of the compound (I) in the resulting pigment composition, and is also preferably not more than 25 minutes, more preferably not more than 20 minutes, even more preferably not more than 15 minutes, further even more preferably not more than 10 minutes, still further even more preferably not more than 5 minutes and still further even more preferably not more than 4 minutes from the viewpoint of enhancing productivity of the resulting pigment composition as well as from the viewpoint of inhibiting discoloration of PY74.

The pressure used upon the heat treatment is not particularly limited, and the heat treatment may be conducted under a pressure near to normal pressures.

The degree of susceptibility to the thermal decomposition may vary depending upon the temperature used in the heat treatment. Therefore, the preferred heat treatment time may also vary depending upon the temperature used in the heat treatment. Since the compound (I) is decomposed according to a second-order reaction equation, the decomposition rate constants k at respective temperatures are calculated therefrom, and Arrhenius plot of the thus obtained values is made to calculate an activation energy and a frequency factor according to the following formula.

Decomposition rate constant $k = A \times \exp(-E/RT)$ wherein A represents a frequency factor [26,909,771 (1/s)]; E represents an activation energy [93,873 (J/mol)]; R represents a gas constant [8.314 (J/mol·K)]; and T represents a Kelvin temperature [K].

From the thus obtained value of the decomposition rate constant k, the value of X is calculated according to the following formula (1) to evaluate the heat treatment time.

That is, the value of X represented by the following formula (1) from which the heat treatment time can be determined is preferably not less than $3 \times 10^{-4}$, more preferably not less than $3 \times 10^{-3}$, even more preferably not less than $1.5 \times 10^{-2}$, further even more preferably not less than $5 \times 10^{-2}$ and still further even more preferably not less than $7 \times 10^{-2}$. Also, from the viewpoint of enhancing productivity of the resulting pigment composition as well as from the viewpoint of inhibiting discoloration of PY74, the value of X is preferably not more than 1, more preferably not more than $5 \times 10^{-1}$, even more preferably not more than $3 \times 10^{-1}$, further even more preferably not more than $2 \times 10^{-1}$ and still further even more preferably not more than $1 \times 10^{-1}$.

$$X[-] = \text{Decomposition rate constant } k[1/s] \times \text{time } t[s] \quad (1)$$

The method of conducting the heat treatment is not particularly limited, and the heat treatment may be conducted using any known heat treatment apparatus. Examples of the heat treatment apparatus include a heat exchanger, an autoclave heating apparatus, a microwave heating apparatus, an infrared heating apparatus, a semiconductor laser heating apparatus and the like. Among these heat treatment apparatuses, preferred are a heat exchanger and a microwave heating apparatus, and from the viewpoint of enhancing productivity of the resulting pigment composition, more preferred is a heat exchanger.

As the heat exchanger, from the viewpoint of enhancing productivity of the resulting pigment composition, a double pipe heat exchanger or a multi-pipe heat exchanger is more preferably used. The double pipe heat exchanger has a double pipe structure constructed of an outer pipe and an inner pipe, and the multi-pipe heat exchanger is constructed of an outer cylinder through which a heat exchanging medium is flowed, and a plurality of inner cylinders disposed inside of the outer cylinder.

Examples of materials of the double pipe heat exchanger or the multi-pipe heat exchanger include highly-heat conductive materials such as stainless steel, aluminum and copper.

Examples of a heat source for the heat exchanger include pressurized steam, heat medium oil, etc. The kind of heat source, set temperature and feed amount per unit time for the heat exchanger may be appropriately adjusted by the heat treatment temperature to be set.

The heat treatment may be conducted by any of a batch method, a semi-batch method and a continuous flow method. However, among these methods, the continuous flow method is preferably used because of facilitated control of heating conditions therefor.

By conducting the aforementioned heat treatment, the content of the compound (I) in the pigment composition after the heat treatment is reduced. From the viewpoint of improving storage stability of the resulting ink composition and preventing occurrence of ejection defects when compounding the pigment composition in an ink for ink-jet printing, etc., the content of the compound (I) in the pigment composition after the heat treatment as measured in terms of a residual rate of the compound (I) on the basis of the content of the compound (I) in the raw material pigment composition before the heat treatment is preferably not more than 75%, more preferably not more than 70%, even more preferably not more than 65%, further even more preferably not more than 60%, still further even more preferably not more than 55%, still further even more preferably not more than 50% and still further even more preferably not more than 46%. Also, from the viewpoint of enhancing productivity of the resulting pigment composition, the content of the compound (I) in the pigment composition after the heat treatment as measured in terms of the aforementioned residual rate thereof is preferably not less than 5%, more preferably not less than 10%, even more preferably not less than 15%, further even more preferably not less than 18% and still further even more preferably not less than 20%.

From the viewpoint of improving storage stability of the resulting ink composition and preventing occurrence of ejection defects when compounding the pigment composition in an ink for ink-jet printing, etc., the content of the compound (I) in the pigment composition after the heat treatment on the basis of the content of PY74 therein is preferably not more than 650 mg/kg, more preferably not more than 600 mg/kg, even more preferably not more than 550 mg/kg, further even more preferably not more than 500 mg/kg, still further even more preferably not more than 450 mg/kg and still further even more preferably not more than 400 mg/kg. Also, from the viewpoint of enhancing productivity of the resulting pigment composition, the content of the compound (I) in the pigment composition after the heat treatment on the basis of the content of PY74 therein is preferably not less than 80 mg/kg, more preferably not less than 100 mg/kg, even more more preferably not less than 130 mg/kg, further even more preferably not less than 150 mg/kg and still further even more preferably not less than 180 mg/kg.

The total content of PY74 and the compound (I) in the pigment composition after the heat treatment is preferably not less than 0.1% by mass, more preferably not less than 0.3% by mass, even more preferably not less than 0.5% by mass, further even more preferably not less than 1% by mass, still further even more preferably not less than 2% by mass, still further even more preferably not less than 3% by mass, still further even more preferably not less than 5% by mass, still further even more preferably not less than 8% by mass, still further even more preferably not less than 10% by mass and still further even more preferably not less than 15% by mass from the viewpoint of enhancing productivity of the resulting pigment composition, and is also preferably not more than 30% by mass and more preferably not more than 25% by mass from the viewpoint of preventing deterioration in productivity of the pigment composition.

<Preferred Range of Color Difference>

In the case of using any of the raw material pigment compositions (i) and (ii), from the viewpoint of improving color developability of the pigment composition, the degree of discoloration of the pigment in the pigment composition owing to the heat treatment is preferably small. The color difference ΔE* of the pigment in the form of particles in L*, a*, b* color specification system between before and after the heat treatment as shown in Examples is preferably less than 6.5, more preferably less than 4.5, even more preferably less than 3.2 and further even more preferably less than 2.8.

<Preferred Range of Particle Size>

In the case of using the raw material pigment composition (iii), from the viewpoint of improving dispersion stability of the resulting pigment composition, it is preferred that the pigment composition suffers from less change in particle size of particles dispersed therein owing to the heat treatment. The rate of change in particle size of the particles dispersed in the pigment composition between before and after the heat treatment as shown in Examples is preferably less than 130%, more preferably less than 120%, even more preferably less than 115% and further even more preferably not more than 110%.

[Method of Reducing Content of Compound (I)]

The method of reducing a content of a compound (I) according to the present invention is a method of reducing a content of the compound (I) in a raw material pigment composition containing PY74, the compound (I) and water, which includes the step of subjecting the raw material pigment composition to heat treatment at a temperature of not lower than 160° C. and not higher than 210° C.

The compound (I) is deteriorated in heat resistance as compared to PY74. Therefore, by utilizing the difference in heat resistance between the compound (I) and PY74, more specifically, by subjecting the raw material pigment composition to the heat treatment at a temperature at which the compound (I) is more likely to undergo thermal decomposition than PY74, it is possible to effectively reduce the content of the compound (I) in the raw material pigment composition.

With respect to the aforementioned embodiments, the present invention further provides the following aspects relating to the process for producing a pigment composition and the method of reducing a content of a compound (I) in a raw material pigment composition.

<1> A process for producing a pigment composition, including the step of subjecting a raw material pigment composition containing C.I. Pigment Yellow 74, a compound (I) represented by the following formula (I-1) or (I-2) and water to heat treatment at a temperature of not lower than 160° C. and not higher than 210° C.:

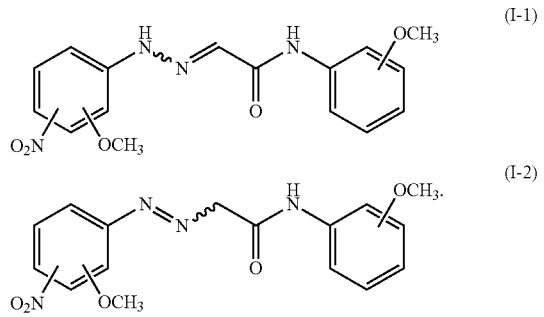

<2> The process for producing a pigment composition according to the aspect <1>, wherein the compound represented by the formula (I-1) is a compound represented by the following formula (I-1-1), and the compound represented by the formula (I-2) is a compound represented by the following formula (I-2-1):

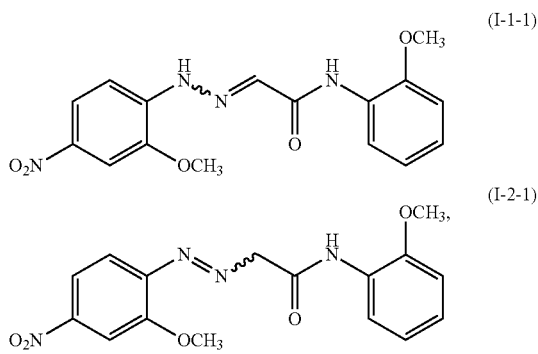

<3> The process for producing a pigment composition according to the aspect <1> or <2>, wherein the C.I. Pigment Yellow 74 is produced by a method of subjecting a diazotization product of m-nitro-o-anisidine to coupling reaction with acetoacetic-o-anisidide.

<4> The process for producing a pigment composition according to any one of the aspects <1> to <3>, wherein the raw material pigment composition is a raw material pigment composition (i) containing the C.I. Pigment Yellow 74 obtained by the coupling reaction as described in the aspect <3> and water, a raw material pigment composition (ii) obtained by mixing the C.I. Pigment Yellow 74 with water, or a raw material pigment composition (iii) prepared by dispersing the C.I. Pigment Yellow 74 in water using a polymer dispersant.

<5> The process for producing a pigment composition according to the aspect <4>, wherein the polymer dispersant is a synthetic polymer, and the synthetic polymer is in the form of a copolymer containing a constitutional unit derived from a hydrophobic group-containing monomer and a constitutional unit derived from a hydrophilic group-containing monomer.

<6> The process for producing a pigment composition according to any one of the aspects <1> to <5>, wherein a total content of the C.I. Pigment Yellow 74 and the compound (I) in the raw material pigment composition is preferably not less than 0.1% by mass, more preferably not less than 0.3% by mass, even more preferably not less than 0.5% by mass, further even more preferably not less than 1% by mass, still further even more preferably not less than 2% by mass, still further even more preferably not less than 3% by mass, still further even more preferably not less than 5% by mass, still further even more preferably not less than 8% by mass, still further even more preferably not less than 10% by mass and still further even more preferably not less than 15% by mass, and is also preferably not more than 30% by mass and more preferably not more than 25% by mass.

<7> The process for producing a pigment composition according to any one of the aspects <4> to <6>, wherein in the case where the raw material pigment composition is the raw material pigment composition (1) as described in the aspect <4>, a total content of the C.I. Pigment Yellow 74 and the compound (I) in the raw material pigment composition is preferably not less than 0.1% by mass, more preferably not less than 0.3% by mass, even more preferably not less than 0.5% by mass and further even more preferably not less than 1% by mass, and is also preferably not more than 10% by mass, more preferably not more than 5% by mass and even more preferably not more than 3% by mass.

<8> The process for producing a pigment composition according to any one of the aspects <4> to <6>, wherein in the case where the raw material pigment composition is the raw material pigment compositions (ii) or (iii) as described in the aspect <4>, a total content of the C.I. Pigment Yellow 74 and the compound (I) in the raw material pigment composition is preferably not less than 0.1% by mass, more preferably not less than 1% by mass, even more preferably not less than 2% by mass, further even more preferably not less than 3% by mass, still further even more preferably not less than 5% by mass, still further even more preferably not less than 8% by mass, still further even more preferably not less than 10% by mass and still further even more preferably not less than 15% by mass, and is also preferably not more than 30% by mass and more preferably not more than 25% by mass.

<9> The process for producing a pigment composition according to any one of the aspects <4> to <6>, wherein in the case where the raw material pigment composition is the raw material pigment composition (iii), a content of the polymer dispersant in the raw material pigment composition is preferably not less than 1% by mass, more preferably not less than 2% by mass and even more preferably not less than 3% by mass, and is also preferably not more than 10% by mass, more preferably not more than 8% by mass and even more preferably not more than 7% by mass.

<10> The process for producing a pigment composition according to any one of the aspects <1> to <9>, wherein a content of water in the raw material pigment composition is preferably not less than 50% by mass, more preferably not less than 60% by mass and even more preferably not less than 65% by mass, and is also preferably not more than 99% by mass, more preferably not more than 90% by mass and even more preferably not more than 80% by mass.

<11> The process for producing a pigment composition according to any one of the aspects <1> to <10>, wherein a temperature used in the heat treatment is preferably not lower than 165° C., more preferably not lower than 170° C., even more preferably not lower than 172° C. and further even more preferably not lower than 175° C., and is also preferably not higher than 210° C., more preferably not higher than 200° C., even more preferably not higher than 190° C., further even more preferably not higher than 185° C. and still further even more preferably not higher than 180° C.

<12> The process for producing a pigment composition according to any one of the aspects <1> to <11>, wherein a time of the heat treatment is preferably not less than 1 second, more preferably not less than 5 seconds, even more preferably not less than 30 seconds, further even more preferably not less than 1 minute and still further even more preferably not less than 2 minutes, and is also preferably not more than 25 minutes, more preferably not more than 20 minutes, even more preferably not more than 15 minutes, further even more preferably not more than 10 minutes, still further even more preferably not more than 5 minutes and still further even more preferably not more than 4 minutes.

<13> The process for producing a pigment composition according to any one of the aspects <1> to <12>, wherein the time of the heat treatment is controlled such that a value of X calculated according to the following formula (1) is preferably not less than $3 \times 10^{-4}$, more preferably not less than $3 \times 10^{-3}$, even more preferably not less than $1.5 \times 10^{-2}$, further even more preferably not less than $5 \times 10^{-2}$ and still further even more preferably not less than $7 \times 10^{-2}$, and is also preferably not more than 1, more preferably not more than $5 \times 10^{-1}$, even more preferably not more than $3 \times 10^{-1}$, further even more preferably not more than $2 \times 10^{-1}$ and still further even more preferably not more than $1 \times 10^{-1}$:

$$X[-]=\text{Decomposition rate constant } k[1/s] \times \text{time } t[s] \quad (1).$$

<14> The process for producing a pigment composition according to any one of the aspects <1> to <13>, wherein a content of the compound (I) in the pigment composition after the heat treatment on the basis of a content of the compound (I) in the raw material pigment composition before the heat treatment is reduced to preferably not more than 75%, more preferably not more than 70%, even more preferably not more than 65%, further even more preferably not more than 60%, still further even more preferably not more than 55%, still further even more preferably not more than 50% and still further even more preferably not more than 46%, and is also preferably not less than 5%, more preferably not less than 10%, even more preferably not less than 15%, further even more preferably not less than 18% and still further even more preferably not less than 20%.

<15> The process for producing a pigment composition according to any one of the aspects <1> to <14>, wherein the heat treatment is conducted using a heat exchanger.

<16> The process for producing a pigment composition according to any one of the aspects <1> to <15>, wherein the heat treatment is conducted using a double pipe heat exchanger or a multi-pipe heat exchanger.

<17> The process for producing a pigment composition according to any one of the aspects <1> to <16>, wherein the content of the compound (I) in the pigment composition after the heat treatment on the basis of the content of the C.I. Pigment Yellow 74 therein is preferably not more than 650 mg/kg, more preferably not more than 600 mg/kg, even more preferably not more than 550 mg/kg, further even more preferably not more than 500 mg/kg, still further even more preferably not more than 450 mg/kg and still further even more preferably not more than 400 mg/kg, and is also preferably not less than 80 mg/kg, more preferably not less than 100 mg/kg, even more more preferably not less than 130 mg/kg, further even more preferably not less than 150 mg/kg and still further even more preferably not less than 180 mg/kg.

<18> A method of reducing a content of a compound (I) represented by the aforementioned formula (I-1) or (I-2) in a raw material pigment composition containing C.I. Pigment Yellow 74, the compound (I) and water, said method including the step of subjecting the raw material pigment composition to heat treatment at a temperature of not lower than 160° C. and not higher than 210° C.

<19> A pigment composition produced by the process according to any one of the aspects <1> to <17>.

EXAMPLES

In the following Examples and Comparative Examples, quantitative determination of the compound (I) was conducted by the following method.

<Quantitative Determination of Compound (I)>

The pigment compositions before and after the heat treatment were respectively dried under reduced pressure at 40° C. for 24 hours, thereby obtaining a pigment in the form of particles. The thus obtained pigment particles were dissolved in tetrahydrofuran (THF for high-speed liquid chromatography) available from Wako Pure Chemical Industries, Ltd., and diluted 10,000 times by mass therewith.

Then, the obtained diluted solution was filtered through a 0.45 μm-mesh filter "EKIKURODISK 13Cr" available from Pall Corporation.

The resulting THF solution of the pigment was subjected to mass spectrometry under the following measuring conditions using a liquid chromatograph mass spectrometer "LCMS-2020" available from Shimadzu Corporation to thereby conduct quantitative determination of the compound (I) (m/z: 345). Meanwhile, the retention time of the compound (I) was from 2.8 to 3.2 minutes.

The content (mg/kg) of the compound (I) on the basis of the content of the pigment was obtained from the thus determined amount of the compound (I).

(Measuring Conditions)

Eluent A: {Formic acid/ammonium formate buffer solution; pH; 3.0}: MeOH=10:90 (volume ratio at 25° C.)

Eluent B: Methanol:THF:formic acid=10:90:0.1 (volume ratio at 25° C.) (The fumaric acid and ammonium formate both were "guaranteed" reagents available from Wako Pure Chemical Industries, Ltd., and the methanol and THF both were reagents (for high-speed chromatograph) available from Wako Pure Chemical Industries, Ltd.

Gradient elution conditions: B0% (0 minute)—B0% (5 minutes)—B100% (5.1 minutes)—B100% (7 minutes)—B0% (7.1 minutes)—B0% (13 minutes)

Column: "L-Column 2 ODS" (2.1×150 mm, 5 μm) available from Chemicals Evaluation and Research Institute, Japan Detection: MS (Electrospray Ionization (ESI) method; ionization mode: positive)

Amount injected: 10

Quantitative determination method:

The compound (I) obtained by the following isolation method was dissolved in methanol to obtain solutions for preparation of a calibration curve having concentrations of 0.1, 0.5, 1, 5, 10, 50 and 100 mg/kg, respectively. Using the aforementioned LCMS-2020, the thus obtained solutions were subjected to mass spectrometry under the aforementioned measuring conditions to prepare a calibration curve for quantitative determination of the compound (I). From the obtained peak value, the content of the compound (I) was quatitativbely determined according to the calibration curve thus prepared.

(Method for Isolation of Compound (I))

The compound (I) was isolated by the method for isolation of the compound (I) as described in the paragraph [0040] of Japanese Patent Application No. 2014-149870.

The thus isolated compound was analyzed using MS-MS (Q-Exactive; positive mode) available from Thermo Fisher Scientific K.K. As a result, it was shown that the compound had m/z: 345 ([M+H]$^+$ ion: 345.1194 $C_{16}H_{17}O_5N_4$). Furthermore, as a result of subjecting the compound to fragment analysis, it was confirmed that the compound (I) was a compound represented by the aforementioned formula (I-1-1) or (I-2-1).

Main fragments detected are as follows.

[CONHC$_6$H$_4$OCH$_3$]$^+$ ion; 150.0551,
[NC$_6$H$_3$(NO$_2$)(OCH$_3$)]+H]$^+$ ion; 167.0452,
[COCH$_2$NNC$_6$H$_3$(NO$_2$)(OCH$_3$)]$^+$ ion; 222.0511

<Color Difference of Pigment before and after Heat Treatment>

The degrees of discoloration of the pigment in each of the raw material pigment compositions (i) and (ii) before and after the heat treatment were measured using a differential colorimeter. As the differential colorimeter, "CR-400" available from Konica Minolta Japan, Inc., was used, and the obtained value was calibrated using a white calibration plate (Y: 86.7, x; 0.3156, y: 0.3228). Thereafter, about 0.05 g of the pigment particles before the heat treatment were filled in a micro petri dish available from Konica Minolta Japan, Inc., and coordinates L*, a*, b* in L*, a*, b* color specification system were measured in a dark field. The thus obtained values were used as reference values for the color difference.

Then, the respective raw material pigment compositions were subjected to the heat treatment, and 0.05 g of the pigment particles obtained according to the procedure described in the aforementioned item <Quantitative Determination of Compound (I)> were filled in a micro petri dish, and coordinates L*, a*, b* were measured in a dark field.

From the values obtained above, the color difference ΔE* defined by ΔL*, Δa* and Δb* as the difference values of L*, a* and b*, respectively, was calculated according to the following formula and evaluated.

$$\Delta E^* = [(\Delta L^*)^2 + (\Delta a^*)^2 + (\Delta b^*)^2]^{0.5}$$

<Change in Particle Size of Particles Dispersed in Composition Between Before and after Heat Treatment>

The rate of change in particle size of the particles dispersed in the raw material pigment composition (iii) between before and after the heat treatment was measured. Specifically, the particles were subjected to cumulant analysis using a laser particle analyzing system "ELS-Z1000" available from Otsuka Electrics Co., Ltd., to measure particle sizes thereof. The above measurement was conducted under the conditions including a temperature of 25° C., an angle between incident light and detector of 90° and a cumulative number of 100 times, and a refractive index of water (1.333) was input to the analyzing system as a refractive index of the dispersing medium. The measurement was conducted by adjusting a concentration of the dispersion to be measured to $5 \times 10^{-3}$% by mass in terms of a solid content thereof.

The rate (%) of change in particle size of the particles dispersed in the raw material pigment composition between before and after the heat treatment was calculated according to the following formula and evaluated.

Rate (%) of change in particle size of particles dispersed=[(particle size of particles dispersed after heat treatment)/(particle size of particles dispersed before heat treatment)]×100

<Method of Calculating Decomposition Rate Constant k and Value of X>

The same procedure as in Example 1 was conducted except that the heating temperature was adjusted to 160° C., 175° C. and 200° C., respectively, and the heating time was adjusted to 1 minute, 3 minutes, 10 minutes and 30 minutes, respectively, to thereby determine a content of the compound (I) per 1 kg of PY74 in the pigment composition under the aforementioned respective measuring conditions. Since the compound (I) was decomposed according to a second order reaction equation, the decomposition rate constants k at the respective heating temperatures of 160° C., 175° C. and 200° C. were calculated therefrom. Using the thus determined values, Arrhenius plot was conducted to calculate an activation energy E=93,873 [J/mol] and a frequency factor A=26,909,771 [l/s]. From these values, the decomposition rate constant k [l/s] at each heating temperature as well as the value of X represented by the following formula (1) were calculated.

Decomposition rate constant k=A×exp(−E/RT)

$X[-]$=Decomposition rate constant $k$[l/s]×time $t$[s]  (1).

Example 1

A mixture prepared by mixing 16 parts by mass of PY74 available from Sanyo Color Works, Ltd., and 84 parts by mass of ion-exchanged water at room temperature (25° C.) was dispersed by a high-speed emulsifying disperser "T.K. ROBOMIX" available from Primix Corporation equipped with a ϕ32 disper blade at a rotating speed of 6400 rpm for 30 minutes, thereby obtaining a preliminary dispersion.

Twenty (20) parts by mass of the thus obtained preliminary dispersion were charged into a 30 mL vial "Large Vial G30" (attachment) available from Anton Paar Japan K.K., and the vial was hermetically closed. The vial was fitted to a microwave heating oven "Monowave 300" available from Anton Paar Japan K.K., and the contents of the vial were subjected to microwave heat treatment at an output of 500 W while stirring with a stirrer. After reaching 200° C., the contents of the vial were maintained at 200° C. for 1 minute. Thereafter, irradiation of the microwave was stopped, and the contents of the vial were air-cooled to 70° C. Meanwhile, the time period elapsed until reaching 200° C. from room temperature was 60 seconds.

The contents of the compound (I) per 1 kg of PY74 in the respective pigment compositions before and after the heat treatment were determined to calculate a residual rate of the compound (I) in the resulting pigment composition. The results are shown in Table 1.

Examples 2 to 12 and Comparative Examples 1 to 4

The same procedure as in Example 1 was repeated except for using the temperatures and times shown in Table 1. The results are shown in Table 1.

Example 13

A mixture prepared by mixing 10 parts by mass of PY74 available from Sanyo Color Works, Ltd., and 90 parts by mass of ion-exchanged water was dispersed by a high-speed emulsifying disperser "T.K. ROBOMIX" available from Primix Corporation equipped with a ϕ32 disper blade at a rotating speed of 6400 rpm for 30 minutes, thereby obtaining a preliminary dispersion.

One hundred (100) parts by mass of the thus obtained preliminary dispersion were charged into a 1 L autoclave, and the autoclave was hermetically closed. The contents of the autoclave were heated at a temperature rise rate of 11° C./minute using a heater while stirring. After reaching 200° C., the contents of the autoclave were maintained at 200° C. for 2 minutes. Thereafter, the operation of the heater was stopped, and the contents of the autoclave were air-cooled to 70° C.

The contents of the compound (I) per 1 kg of PY74 in the respective pigment compositions before and after the heat treatment were determined to calculate a residual rate of the compound (I) in the resulting pigment composition. The results are shown in Table 2.

Example 14

The same procedure as in Example 13 was repeated except for using the temperature and time shown in Table 2. The results are shown in Table 2.

TABLE 1

| | Heat treatment conditions (microwave) | | Content of compound (I) on the basis of content of PY74 in pigment composition | | | Degree of discoloration of pigment after heat treatment | Heat treatment time Decomposition | |
|---|---|---|---|---|---|---|---|---|
| | Temperature (° C.) | Time (minute(s)) | Before heat treatment (mg/kg) | After heat treatment (mg/kg) | Residual rate (%) | Color difference ΔE* | rate constant k (1/s) | X (—) |
| Example 1 | 200 | 1 | 945 | 508 | 53.8 | 3.9 | 1.2E−03 | 6.9E−02 |
| Example 2 | 200 | 3 | 945 | 329 | 34.8 | 4.7 | 1.2E−03 | 2.1E−01 |
| Example 3 | 200 | 10 | 945 | 224 | 23.7 | 5.4 | 1.2E−03 | 6.9E−01 |
| Example 4 | 175 | 1 | 945 | 649 | 68.7 | 1.0 | 3.1E−04 | 1.8E−02 |
| Example 5 | 175 | 3 | 945 | 629 | 66.6 | 1.9 | 3.1E−04 | 5.5E−02 |
| Example 6 | 175 | 5 | 945 | 544 | 57.6 | 2.7 | 3.1E−04 | 9.2E−02 |
| Example 7 | 175 | 10 | 945 | 429 | 45.4 | 3.0 | 3.1E−04 | 1.8E−01 |
| Example 8 | 175 | 20 | 945 | 388 | 41.0 | 4.3 | 3.1E−04 | 3.7E−01 |
| Example 9 | 180 | 20 | 945 | 368 | 38.9 | 4.4 | 4.0E−04 | 4.8E−01 |
| Example 10 | 170 | 20 | 945 | 355 | 37.6 | 3.6 | 2.3E−04 | 2.8E−01 |
| Example 11 | 165 | 20 | 945 | 527 | 55.8 | 3.3 | 1.7E−04 | 2.1E−01 |
| Example 12 | 175 | 30 | 945 | 312 | 33.0 | 6.0 | 3.1E−04 | 5.5E−01 |
| Comparative Example 1 | 150 | 1 | 945 | 912 | 96.5 | 0.9 | 6.9E−05 | 4.1E−03 |
| Comparative Example 2 | 150 | 30 | 945 | 727 | 76.9 | 2.7 | 6.9E−05 | 1.2E−01 |
| Comparative Example 3 | 115 | 300 | 945 | 754 | 79.8 | 4.8 | 6.2E−06 | 1.1E−01 |
| Comparative Example 4 | 220 | 10 | 945 | 0 | 0.0 | 13.1 | 3.0E−03 | 1.8E+00 |

TABLE 2

| | Heat treatment conditions (autoclave) | | Content of compound (I) on the basis of content of PY74 in pigment composition | | | Degree of discoloration of pigment after heat treatment | Heat treatment time | |
|---|---|---|---|---|---|---|---|---|
| | Temperature (° C.) | Time (minute(s)) | Before heat treatment (mg/kg) | After heat treatment (mg/kg) | Residual rate (%) | Color difference ΔE* | Decomposition rate constant k (1/s) | X (—) |
| Example 13 | 200 | 2 | 1212 | 311 | 25.7 | 4.4 | 1.2E−03 | 1.4E−01 |
| Example 14 | 175 | 15 | 1212 | 413 | 34.1 | 3.2 | 3.1E−04 | 2.7E−01 |

Example 15

A mixture prepared by mixing 18.3 parts by mass of PY74 available from Sanyo Color Works, Ltd., 21.6 parts by mass of a 25% by mass aqueous solution of "JONCRYL 68" (styrene/acrylic acid copolymer-based dispersant) available from BASF, and 60.1 parts by mass of ion-exchanged water was dispersed by a high-speed emulsifying disperser "T.K. ROBOMIX" available from Primix Corporation equipped with a φ32 disper blade at a rotating speed of 6400 rpm for 30 minutes, thereby obtaining a preliminary dispersion.

One hundred (100) parts by mass of the preliminary dispersion and 888 parts by mass of 0.5 mmφ zirconia beads were charged into a hexaplex sand mill "Model No. 6TSG-1/4" available from AIMEX Co., Ltd., and dispersed at a temperature of 10° C. for 2 hours by adjusting a peripheral speed of a tip end of a stirring blade to 4 m/s. Thereafter, the zirconia beads were removed from the resulting dispersion, thereby obtaining a pigment dispersion.

Twenty (20) parts by mass of the thus obtained pigment dispersion were charged into a 30 mL vial "Large Vial G30" (attachment) available from Anton Paar Japan K.K., and the vial was hermetically closed. The vial was fitted to a microwave heating oven "Monowave 300" available from Anton Paar Japan K.K., and the contents of the vial were subjected to microwave heat treatment at an output of 500 W while stirring with a stirrer. After reaching 200° C., the contents of the vial were maintained at 200° C. for 5 minutes. Thereafter, irradiation of the microwave was stopped, and the contents of the vial were air-cooled to 70° C. Meanwhile, the time period elapsed until reaching 200° C. was 60 seconds.

The contents of the compound (I) per 1 kg of PY74 in the respective pigment compositions before and after the heat treatment were determined to calculate a residual rate of the compound (I) in the resulting pigment composition. The results are shown in Table 3.

Examples 16 and 17 and Comparative Examples 5 to 7

The same procedure as in Example 15 was repeated except for using the temperatures and times shown in Table 3. The results are shown in Table 3.

TABLE 3

| | Heat treatment conditions (microwave) | | Content of compound (I) on the basis of content of PY74 in pigment composition | | | Change in particle size of particles dispersed after heat treatment | Heat treatment time | |
|---|---|---|---|---|---|---|---|---|
| | Temperature (° C.) | Time (minute(s)) | Before heat treatment (mg/kg) | After heat treatment (mg/kg) | Residual rate (%) | Rate (%) of change in particle size | Decomposition rate constant k (1/s) | X (—) |
| Example 15 | 200 | 5 | 794 | 274 | 34.5 | 125 | 1.2E−03 | 3.5E−01 |
| Example 16 | 200 | 0.017 | 794 | 525 | 66.1 | 108 | 1.2E−03 | 1.2E−03 |
| Example 17 | 175 | 3 | 794 | 557 | 70.2 | 109 | 3.1E−04 | 5.5E−02 |
| Comparative Example 5 | 150 | 3 | 794 | 630 | 79.3 | 107 | 6.9E−05 | 1.2E−02 |
| Comparative Example 6 | 120 | 10 | 794 | 660 | 83.1 | 110 | 9.0E−06 | 5.4E−03 |
| Comparative Example 7 | 220 | 10 | 794 | 0 | 0 | 152 | 3.0E−03 | 1.8E+00 |

From Tables 1 to 3, it was confirmed that the pigment compositions obtained in Examples 1 to 17 had a low residual rate of the compound (I) therein as compared to those in the pigment compositions obtained in Comparative Examples 1 to 7. For this reason, it can be expected that when using the respective pigment compositions obtained in Examples 1 to 17 in an ink for ink-jet printing, the resulting ink is excellent in ejection properties.

INDUSTRIAL APPLICABILITY

When the pigment composition obtained according to the production process of the present invention is used in an ink for ink-jet printing, the resulting ink can be prevented from suffering from ejection defects, and is excellent in storage stability.

The invention claimed is:

1. A process for producing a pigment composition, comprising the step of subjecting a raw material pigment composition comprising C.I. Pigment Yellow 74, a compound (I) represented by the following formula (I-1) or (I-2) and water to heat treatment at a temperature of not lower than 160° C. and not higher than 210° C.:

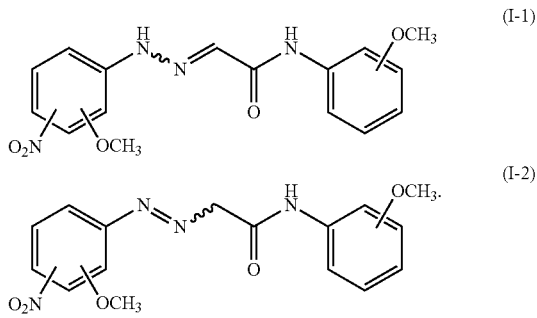

2. The process for producing a pigment composition according to claim 1, wherein a temperature used in the heat treatment is not lower than 165° C. and not higher than 210° C.

3. The process for producing a pigment composition according to claim 1, wherein the heat treatment is conducted for a time of not less than 1 second and not more than 25 minutes.

4. The process for producing a pigment composition according to claim 1, wherein the heat treatment is conducted for a time of not less than 5 seconds and not more than 25 minutes.

5. The process for producing a pigment composition according to claim 1, wherein the time of the heat treatment is controlled such that a value of X represented by the following formula (1) is not less than $3 \times 10^{-4}$ and not more than 1:

$$X[-]=\text{Decomposition rate constant } k \text{ [l/s]} \times \text{time } t \text{ [s]} \quad (1).$$

6. The process for producing a pigment composition according to claim 1, wherein the time of the heat treatment is controlled such that a value of X represented by the following formula (1) is not less than $3 \times 10^{-3}$ and not more than $5 \times 10^{-1}$:

$$X[-]=\text{Decomposition rate constant } k\text{[l/s]} \times \text{time } t\text{[s]} \quad (1).$$

7. The process for producing a pigment composition according to claim 1, wherein a content of the compound (I) in the pigment composition after the heat treatment is reduced to not more than 75% of a content of the compound (I) in the raw material pigment composition before the heat treatment.

8. The process for producing a pigment composition according to claim 1, wherein a content of the compound (I) in the pigment composition after the heat treatment is reduced to not less than 5% and not more than 70% of a content of the compound (I) in the raw material pigment composition before the heat treatment.

9. The process for producing a pigment composition according to claim 1, wherein the heat treatment is conducted using a double pipe heat exchanger or a multi-pipe heat exchanger.

10. The process for producing a pigment composition according to claim 1, wherein the content of the compound (I) in the pigment composition after the heat treatment is not more than 650 mg/kg on the basis of a content of the C.I. Pigment Yellow 74 in the pigment composition after the heat treatment.

11. The process for producing a pigment composition according to claim 1, wherein the content of the compound (I) in the pigment composition after the heat treatment is not less than 80 mg/kg and not more than 600 mg/kg on the basis of a content of the C.I. Pigment Yellow 74 in the pigment composition after the heat treatment.

12. The process for producing a pigment composition according to claim 1, wherein a total content of the C.I. Pigment Yellow 74 and the compound (I) in the raw material pigment composition is not less than 0.1% by mass and not more than 30% by mass.

13. The process for producing a pigment composition according to claim 1, wherein a total content of the C.I. Pigment Yellow 74 and the compound (I) in the raw material pigment composition is not less than 1% by mass and not more than 30% by mass.

14. The process for producing a pigment composition according to claim 1, wherein the C.I. Pigment Yellow 74 is produced by a method of subjecting a diazotization product of m-nitro-o-anisidine to coupling reaction with acetoacetic-o-anisidide.

15. The process for producing a pigment composition according to claim 1, wherein the raw material pigment composition is a raw material pigment composition (i) comprising the C.I. Pigment Yellow 74, which is obtained by subjecting a diazotization product of m-nitro-o-anisidine to coupling reaction with acetoacetic-o-anisidide, and water, a raw material pigment composition (ii) obtained by mixing the C.I. Pigment Yellow 74 with water, or a raw material pigment composition (iii) prepared by dispersing the C.I. Pigment Yellow 74 in water using a polymer dispersant.

16. The process for producing a pigment composition according to claim 15, wherein the polymer dispersant is a synthetic polymer, and the synthetic polymer is in the form of a copolymer containing a constitutional unit derived from a hydrophobic group-containing monomer and a constitutional unit derived from a hydrophilic group-containing monomer.

17. The process for producing a pigment composition according to claim 1, wherein in the case where the raw material pigment composition is the raw material pigment composition (iii), a content of the polymer dispersant in the raw material pigment composition is not less than 1% by mass and not more than 10% by mass.

18. The process for producing a pigment composition according to claim 1, wherein a content of water in the raw material pigment composition is not less than 50% by mass and not more than 99% by mass.

19. The process for producing a pigment composition according to claim 1, wherein a content of water in the raw material pigment composition is not less than 65% by mass and not more than 90% by mass.

20. The process for producing a pigment composition according to claim 1, wherein the compound represented by the formula (I-1) is a compound represented by the following formula (I-1-1), and the compound represented by the formula (I-2) is a compound represented by the following formula (I-2-1):

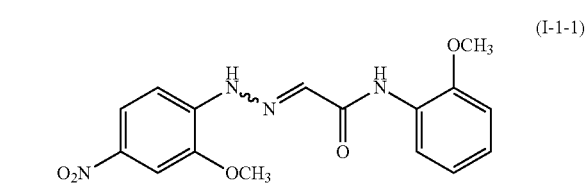

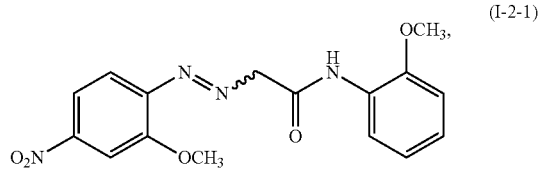

(I-2-1)

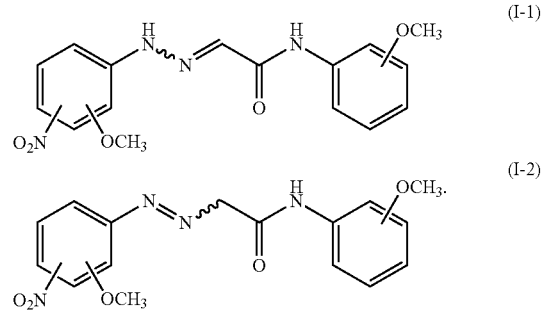

(I-1)

(I-2)

21. A method of reducing a content of a compound (I) represented by the following formula (I-1) or (I-2) in a raw material pigment composition comprising C.I. Pigment Yellow 74, the compound (I) represented by the following formula (I-1) or (I-2) and water, said method comprising the step of subjecting the raw material pigment composition to heat treatment at a temperature of not lower than 160° C. and not higher than 210° C.:

* * * * *